(12) United States Patent
Fukuoka

(10) Patent No.: US 11,841,326 B2
(45) Date of Patent: Dec. 12, 2023

(54) METHOD FOR EXPRESSING NUMERICAL INFORMATION

(71) Applicant: Takao Fukuoka, Joyo (JP)

(72) Inventor: Takao Fukuoka, Joyo (JP)

(73) Assignee: Takao Fukuoka, Joyo (JP)

( * ) Notice: Subject to any disclaimer, the term of this patent is extended or adjusted under 35 U.S.C. 154(b) by 68 days.

(21) Appl. No.: 17/432,174

(22) PCT Filed: Feb. 17, 2020

(86) PCT No.: PCT/JP2020/006015
§ 371 (c)(1),
(2) Date: Aug. 19, 2021

(87) PCT Pub. No.: WO2020/171010
PCT Pub. Date: Aug. 27, 2020

(65) Prior Publication Data
US 2022/0187210 A1    Jun. 16, 2022

(30) Foreign Application Priority Data
Feb. 20, 2019  (JP) ................................. 2019-028939

(51) Int. Cl.
*G01N 21/65*       (2006.01)
(52) U.S. Cl.
CPC .  *G01N 21/658* (2013.01); *G01N 2201/06113* (2013.01)
(58) Field of Classification Search
CPC ........... G01N 21/658; G01N 2201/129; B82Y 15/00; B82Y 40/00; B82Y 20/00; B82Y 30/00; G01J 3/44; G06V 20/80
(Continued)

(56) References Cited

U.S. PATENT DOCUMENTS 5,853,464 A * 12/1998 Macpherson ............ B41M 3/14
106/31.77
9,726,609 B2    8/2017 Natan et al.
(Continued)

FOREIGN PATENT DOCUMENTS

JP          4772273 B2     9/2011
JP       2015-165193 A     9/2015
(Continued)

OTHER PUBLICATIONS

International Search Report dated Mar. 31, 2020, issued in counterpart application No. PCT/JP2020/006015 (3 pages).
(Continued)

*Primary Examiner* — Sunghee Y Gray
(74) *Attorney, Agent, or Firm* — WHDA, LLP

(57) ABSTRACT

A method for expressing multiple types of numerical information using the features of SERS-active nanostructures is disclosed. The method includes: associating a SERS signal with numerical information; applying, to one or more positions a, b, d on a physical object e, nanotags including an aggregate of noble metal nanoparticles with an average diameter of 100 nm or less and a Raman-active chemical substance; irradiating the applied nanotag with a laser; reading the SERS signal generated by the irradiation; and acquiring the numerical information from the read SERS signal on the basis of the association. The nanotags derive from one or more types of nanotag ink A, B, D (FIG. 1). The substance is present on the surface of or in the vicinity of the aggregate and generates SERS.

7 Claims, 3 Drawing Sheets

(58) Field of Classification Search
USPC .......................................................... 356/301
See application file for complete search history.

(56) References Cited

U.S. PATENT DOCUMENTS

| | | | |
|---|---|---|---|
| 2004/0101908 A1 | 5/2004 | Fukuoka et al. | |
| 2006/0038979 A1 | 2/2006 | Natan et al. | |
| 2008/0241262 A1* | 10/2008 | Lee .......................... | B22F 1/17 |
| | | | 428/407 |

FOREIGN PATENT DOCUMENTS

| | | | | |
|---|---|---|---|---|
| JP | 2016-99113 A | 5/2016 | | |
| WO | WO-2010135354 A1 * | 11/2010 | ........... | G01N 33/532 |
| WO | WO-2010138914 A1 * | 12/2010 | ........... | G01N 21/554 |

OTHER PUBLICATIONS

Nabika et al., "Controlled Electromagnetic Field Induced by Localized Surface Plasmon at Well-Defined Metal Nano-Structures", Japanese Journal of Optics, 2009, vol. 38, No. 9, pp. 462-469, cited in ISR (8 pages).

Fukuoka et al., "Application of Gold Nanoparticle Self-assemblies to Unclonable Anti-counterfeiting Technology", CEP-IAAC 2015 Proceedings, 2015, TD3-4, pp. 432-435, cited in ISR and Specification (4 pages).

Li et al., "Multidimensional SERS Barcodes on Flexible Patterned Plasmonic Metafilm for Anticounterfeiting Applications", Advanced Optical Materials, Oct. 2016, vol. 4, Iss. 10, pp. 1475-1480, cited in ISR and Specification (7 pages).

Fleischmann et al., "Raman Spectra of Pyridine Adsorbed at a Silver Electrode", Chemical Physics Letters, May 15, 1974, vol. 26, No. 2, pp. 163-166, cited in Specification (4 pages).

Yamamoto et al., "Why and how do the shapes of surface-enhanced Raman scattering spectra change? Recent progress from mechanistic studies", 2016, 47, pp. 78-88, cited in Specification (11 pages).

Fukuoka et al., "Observation of Nanoparticles by Plasmon Phenomena", Journal of the Society of Powder Technology, Japan, 2007, 44, pp. 546-533, cited in Specification (9 pages).

Fukuoka et al., "Gold Nanoparticles Based Nanosensors/Nanobeacons Fabricated by Bottom-up Method for Surface Enhanced Raman Scattering", Bunseki Kagaku, the Japan Society for Analytical Chemistry, 2017, vol. 66, No. 12, pp. 919-923, cited in Specification (5 pages).

Hara et al., "Surface-enhanced Raman spectroscopy using a coffee-ring-type three-dimensional silver nanostructure", RSC Advances, 2014, 5(2), pp. 1378-1384, cited in Specification (7 pages).

Qin et al., "Nanodisk Codes", Nano Letters, 2007, vol. 7, No. 12, pp. 3849-3853, cited in Specification (5 pages).

Golightly et al., "Surface-Enhanced Raman Spectroscopy and Homeland Security: A Perfect Match?", ACS Nano, 2009, vol. 3, No. 10, pp. 2859-2869, cited in Specification (11 pages).

Cui et al., "Multiplex plasmonic anti-counterfeiting security labels based on surface-enhanced Raman scattering", Chem. Commun., 2015, 51(25), pp. 5363-5366, cited in Specification (4 page).

Tian et al., "Plasmonic Nanogels for Unclonable Optical Tagging", ACS Applied Materials & Interfaces, 2016, 8(6), pp. 4031-4041, cited in Specification (11 pages).

* cited by examiner

[FIG.1]
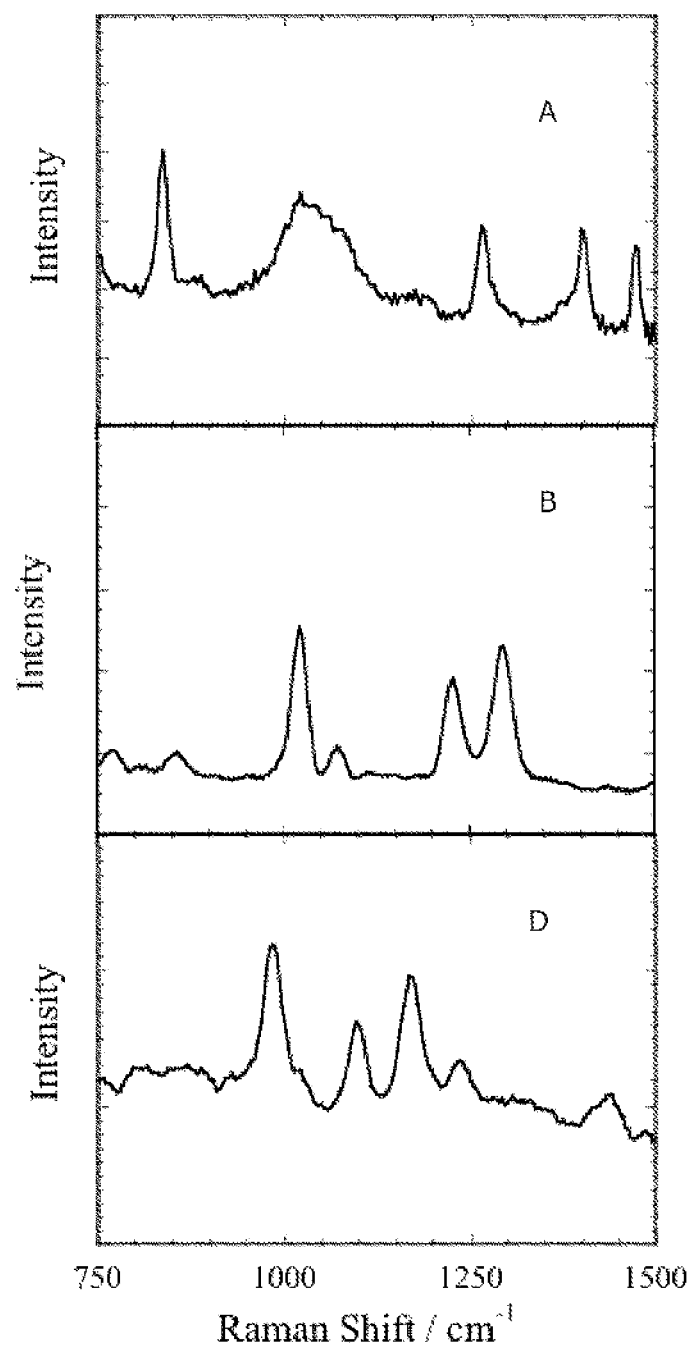

[FIG.2]
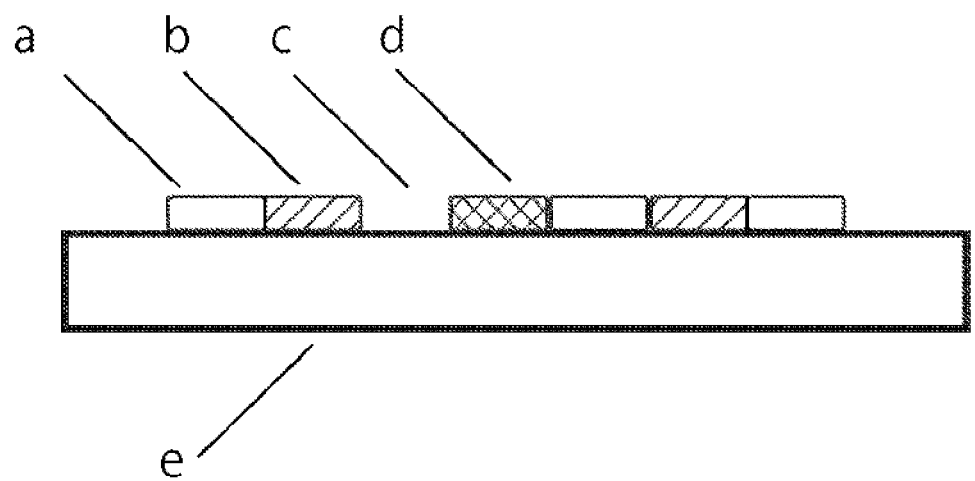
[FIG.3]
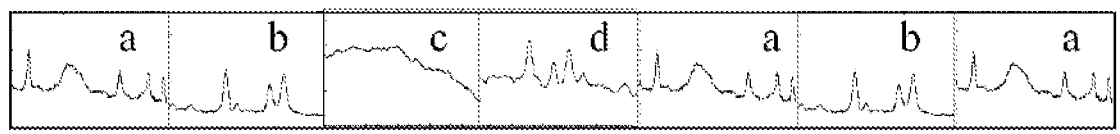

[FIG.4]
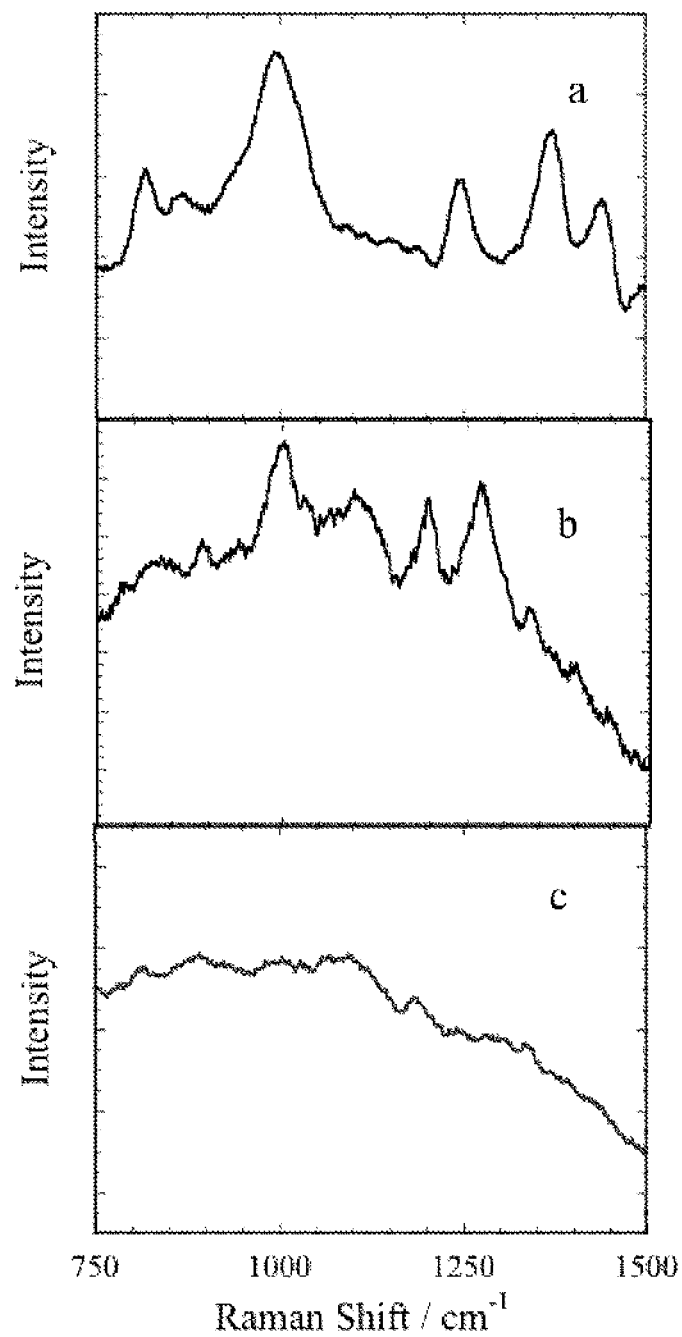

METHOD FOR EXPRESSING NUMERICAL INFORMATION

TECHNICAL FIELD

The present invention relates to a method for expressing numerical information.

BACKGROUND ART

In the information society, there has been an increasing need to apply numerical information to articles for identification and management of the articles. When a variety of articles are labeled with numerical information, minute so-called nano-sized elements are preferably used to manage the information.

Forty years after Norio Taniguchi proposed the term "nanotechnology", K. E. Drexler positioned mass production with atomic-level precision as an "advanced nanotechnology" and pointed out that self-assemblies of nanoparticles had an important role.

As nanoparticles that cause self-assemblies and express functions, noble metal nanoparticles such as gold nanoparticles and silver nanoparticles are known. For example, a colloidal solution of gold nanoparticles shows a vivid red color in a non-aggregated state and shows a bluish-purple color in accordance with a degree of aggregation in an aggregated state.

Aggregated noble metal nanoparticles generate surface-enhanced Raman scattering (SERS) (Non-Patent Literature 1), and applications of SERS to sensors and beacons have been expected. The phenomenon can be described on the basis of an electric field enhancing effect of localized plasmon resonance occurring in the aggregates of the noble metal nanoparticles (Non-Patent Literature 2), and it is possible to obtain information regarding aggregate states through acquisition of absorption spectra (Non-Patent Literature 3). It is thus important to appropriately control self-assemblies in order to cause SERS to be generated using the aggregation of the noble metal nanoparticles. As means to do so, aggregates caused to be generated in a self-assembling manner through diffusion limited aggregation in colloidal solutions (Patent Literature 1 and Non-Patent Literature 4) and self-assembling nanoparticles using convective self-assembly (Patent Literature 2 and Non-Patent Literature 5) have been proposed.

Various techniques to use nanoparticles as tags or information elements have been proposed which is based on utilization of features of the SERS that generates such intense light signals that can be detected even from the nanoparticles and which involves applying Raman-active chemical substances capable of causing SERS to the nanoparticles in advance and detecting presence of the SERS. Examples thereof include a nano-rod structure with junctions (Non-Patent Literature 6), noble metal nanoparticles sealed in microcapsules (Patent Literature 3 and Non-Patent Literature 7), a nano-wire substrate pattern (Non-Patent Literature 8), a film pattern including nano-cube particles (Non-Patent Literature 9), noble metal nanoparticles sealed in gel (Non-Patent Literature 10), and highly controlled dispersions of noble metal nanoparticles (Patent Literature 4 and Non-Patent Literature 11).

CITATION LIST

Patent Literature

Patent Literature 1: Japanese Patent No. 4772273, "Substance Analysis Method"

Patent Literature 2: Japanese Patent Laid-Open No. 2016-99113, "Surface-Enhanced Raman Measurement Method and Surface-Enhanced Raman Measurement Device"

Patent Literature 3: U.S. Pat. No. 9,726,609, "Wavelength Selective SERS Nanotags"

Patent Literature 4: Japanese Patent Laid-Open No. 2015-165193, "Nanobeacon and Anti-Counterfeit Technology Using Same"

Non-Patent Literature

Non-Patent Literature 1: Raman spectra of pyridine adsorbed at a silver electrode, M. Fleischmann, P. J. Hendra, and A. J. McQuillan, Chem. Phys. Lett., 26(2), 163-166 (1974).

Non-Patent Literature 2: Why and how do the shapes of surface-enhanced Raman scattering spectra change? Recent progress from mechanistic studies, Y. S. Yamamoto, T. Itoh, J. Raman Spectrosc., 47, 78-88 (2016).

Non-Patent Literature 3: Observation of Nanoparticles by Plasmon Phenomena, Takao Fukuoka and Yasushige Mori, Journal of the Society of Powder Technology, Japan, 44(1), 546-553 (2007).

Non-Patent Literature 4: Gold Nanoparticles Based Nanosensors/Nanobeacons Fabricated by Bottom-up Method for Surface Enhanced Raman Scattering, Takao Fukuoka, Akinobu Yamaguchi, Yuichi Utsumi, Ryosuke Kuramoto, and Yasushige Mori, the Japan Society for Analytical Chemistry, 66(12), 919 (2017).

Non-Patent Literature 5: Surface-enhanced Raman Spectroscopy Using a Coffee-ring-type Three-dimensional Silver nanostructure, R. Hara, T. Fukuoka, R. Takahashi, Y. Utsumi and A. Yamaguchi, RSC Adv., 5(2), 1378-1384 (2015).

Non-Patent Literature 6: Nanodisk Codes, L. D. Qin, M. J. Banholzer, J. E. Millstone, C. A. Mirkin, Nano. Lett., 7(12), 3849-3853 (2007).

Non-Patent Literature 7: Surface-enhanced Raman spectroscopy and homeland security: A perfect match?, R. S. Golightly, W. E. Doering, and M. J. Natan, ACS Nano, 3(10), 2859-2869 (2009).

Non-Patent Literature 8: Multiplex Plasmonic Anticounterfeiting Security Labels Based on Surface-enhanced Raman Scattering, Y. Cui, I. Y. Phang, Y. H. Lee, M. R. Lee, Q. Zhang, and X. Y. Ling, Chem. Commun., 51(25), 5363-5366 (2015).

Non-Patent Literature 9: Multidimensional SERS Barcodes on Flexible Patterned Plasmonic Metafilm for Anticounterfeiting Applications, D. Li, L. Tang, J. Wang, X. Liu, and Y. Ying, Adv. Opt. Mater. 4, 1475-1480 (2016).

Non-Patent Literature 10: Plasmonic Nanogels for Unclonable Optical Tagging, L. Tian, K. K. Liu, M. Fei, S. Tadepalli, S. Cao, J. A. Geldmeier, V. V. Tsukruk, and S. Singamaneni, ACS Appl. Mater. Interfaces, 8(6), 4031-4041 (2016).

Non-Patent Literature 11: Application of Gold Nanoparticle Self-Assemblies to Unclonable Anti-Counterfeiting Technology, T. Fukuoka, A. Yamaguchi, R. Hara, T. Matsumoto, Y. Utsumi, Y. Mori, 2015 International Conference on Electronics Packaging and iMAPS All Asia Conference (ICEP-IAAC 2015) Proceedings, 432-435, 2015.

SUMMARY OF THE INVENTION

Problems to be Solved by the Invention

In order to use these SERS-active nanostructures as numerical information to be applied to a physical object such as an article, easiness in manufacturing the structures, stability of the structures, easiness in reading SERS signals, and a technique for representing multiple types of numerical information using the SERS signals are needed.

However, a technique that satisfies all these conditions has not yet appeared. For example, even Non-Patent Literature 9 that discloses a technique for handling presence of SERS signals with superhigh sensitivity in a digital manner does not describe formation of the structures into fine particles.

Thus, there has been a strong demand for a technique for expressing multiple types of numerical information using the features of SERS-active nanostructures.

Means of Solving the Problems

Thus, a method for expressing numerical information according to the present invention includes: associating a SERS signal with numerical information; and applying, to one, two, or more positions on a physical object, one type or two or more types of nanotags having an aggregate of noble metal nanoparticles with an average diameter of 100 nm or less and a Raman-active chemical substance. The substance is present on the surface of or in the vicinity of the aggregate, and generates SERS. The method also includes irradiating the applied nanotag with a laser, reading the SERS signal generated by the irradiation, and acquiring the numerical information from the read SERS signal on the basis of the above-mentioned association.

The aggregate may be any aggregate of the noble metal nanoparticles with an average diameter of 100 nm or less. The chemical substance has to be present on the surface of or in the vicinity of the aggregate, and the chemical substance is preferably present on or in the vicinity of the individual noble metal nanoparticles in the aggregate as well.

The application of the nanotags to the physical object can be realized by synthesizing nanotag ink by adding the Raman-active chemical substance to a dispersion of the aggregates of the noble metal nanoparticles or adding the noble metal nanoparticles to be aggregated or a solution containing thereof to a solution containing the Raman-active chemical substance to obtain a dispersion, performing printing, ejection, application, spraying, injection or the like of the nanotag ink on the physical object, and then removing an unnecessary solvent from the ink. It is only necessary for the solvent to be removed to such an extent that the SERS signal can be read. Each of the number of types of noble metals and the number of types of chemical substances to be combined may be one or more. The numerical information can be obtained on the basis of presence of a nanotag even if one type of noble metal and one type of chemical substance are combined. If a plurality of types of noble metals and a plurality of types of chemical substances are combined, a plurality of types of nanotags are formed on the physical object, and it is thus possible to obtain multiple types of numerical information through observation of different SERS signals from each nanotag in addition to the presence of the nanotags.

Effects of the Invention

It is only necessary for the nanotag applied to a physical object to contain an aggregate of noble metal nanoparticles and a Raman-active chemical substance, the physical object can thus be small or have a distorted shape, and it is possible to efficiently identify and manage a variety of articles and the like by applying numerical information to the articles and the like.

BRIEF DESCRIPTION OF THE DRAWINGS

FIG. 1 is an example of SERS spectra of three types of nanotag ink A, B and D obtained by preparing three types of Raman-active chemical substances and synthesizing colloidal solutions of three types of noble metal nanoparticles;

FIG. 2 is a schematic diagram illustrating an image of nanotags applied to a plurality of different positions of a physical object;

FIG. 3 illustrates a series of items of information including SERS spectra observed when the nanotags on the physical object in FIG. 2 were scanned with a laser; and FIG. 4 is SERS spectra observed at positions a and b onto which two types of nanotag ink A and B were ejected and a Raman spectrum observed at a position c onto which nothing was ejected when each type of the nanotag ink was ejected onto different positions on a paper using a micropipette and a line including the positions was irradiated with a laser.

MODE FOR CARRYING OUT THE INVENTION

Surface-enhanced Raman scattering (SERS) is a phenomenon where Raman scattering intensity of a Raman-active chemical substance that is present in the vicinity of noble metal nanoparticles with unique localized plasmon resonance wavelengths extremely increases when excitation is caused with lasers with a wavelength corresponding to the unique localized plasmon resonance wavelengths. Patent Literatures 1, 2 and 3 and Non-Patent Literatures 4, 5 and 6 disclose examples of noble metal nanoparticles that generates the SERS. Although the aggregate of the noble metal nanoparticles is not limited as long as the aggregate generates the SERS, it is desirable that the aggregate be self-assembly of gold colloid or silver colloid formed through diffusion limited aggregation, convective self-assembly or the like. This is because the self-assembly of gold colloid or silver colloid can be easily manufactured and can be easily handled as nanotag ink in processes such as storing, transporting, ejection, and printing.

The Raman-active chemical substance that causes characteristic SERS is not limited. For example, chemical substances disclosed in the aforementioned citation list such as Patent Literature 3 and Non-Patent Literature 8, and chemical substances registered in "Spectral Database for Organic Compounds SDBS" of National Institute of Advanced Industrial Science and Technology may be used. If a dye such as Rhodamine 6G is used as the chemical substance, there is an advantage that the nanotag ink is also colored and it is thus possible to make the position to which the nanotag is applied visually recognizable when the nanotag ink is applied to the physical object. On the contrary, if a substance that is not a dye, such as 4,4'-bipyridine, is used, there is an advantage that it is difficult to visually recognize the nanotag when the nanotag is applied to the physical object and confidentiality is enhanced.

Although a timing at which the Raman-active chemical substance is caused to be present together with the noble metal nanoparticles is not limited, it is desirable that the Raman-active chemical substance be caused to present together at a timing of a self-assembling process of gold colloid or silver colloid so that the Raman-active chemical substance can easily enter a hot spot that generates intense SERS since it is known that such a hot spot appears in any of the gaps among the nanoparticles.

A method for applying the nanotag ink to the physical object such as an article through ejection, printing or the like is not limited, and a known technique such as a typical dispenser or ink-jet printing used for liquid containing typical nanoparticles and pigments can be used. The nanotag ink may be applied to the surface of the physical object or may be applied to the inside of the physical object. In order to apply to the inside, the nanotag ink may be injected using an injector or the like, or in a case in which a polymer is used as at least a part of constituting materials of the physical object, the nanotag ink may be mixed into the polymer in a polymerization stage or a curing stage.

The depth at which the nanotag is applied to the inside of the physical object cannot be particularly specified since such depth depends on the laser wavelength, the Raman scattering wavelength, the characteristics of the article, and additives, and the depth is not particularly limited as long as the laser reaches the depth at which the nanotag is present and Raman scattering light can be extracted.

The positions to which the nanotag is applied may be a specific position in the physical object or the entire surface of the physical object. This is because SERS can be observed as long as at least several nanotags are included within the range of a laser spot of the Raman spectroscopy although this condition depends on the performance of the Raman spectroscopy and cannot be stated flatly. In a case in which the nanotag is applied to a specific position of the article, the amount of nanotag ink is preferably 1 µL or less and is more preferably 0.2 µL or less per position in order to detect SERS signals with different shapes from the different types of nanotag ink through laser scanning. This is because the radius of the area of the nanotag applied, that is, an ink stain is 1 mm or less if the amount of nanotag ink is 1 µL or less and the radius is 20 µm or less if the amount of nanotag ink is 0.2 µL or less. In the case of the application to the entire surface, and when four gold nanoparticles with a particle diameter of 50 nm are aggregated to form one nanotag, for example, at least one nanotag is present in a 10 µm square as long as a weight concentration of gold in the nanotag ink is about 5 ppm, which is sufficient in terms of the spot diameter of the laser.

Since the generation of SERS depends on a state of localized plasmon resonance that the nanotag has (FIG. 2 in Non-Patent Literature 2), it is preferable that apparent absorbance derived from the nanotag be high and that the state be present stably for a specific period of time in the wavelength of the laser for SERS measurement or the wavelength of Raman scattering in order to read the SERS signals through irradiation of the nanotag applied to the physical object with the laser. Alternatively, a laser with a wavelength overlapping the localized plasmon resonance wavelength that the nanotag has may be selected.

Different types of nanotags may be present together at the same position by applying a plurality of types of nanotag ink to the same position. This is because peaks of Raman spectra are typically sharp, it is thus not difficult to identify the nanotags even if the spectra of SERS signals with a plurality of shapes overlap each other and it is possible to analyze complicated spectra as well by chemometrics.

Whether a specific type of nanotag is preset at a specific position can be determined on the basis of the shape of a spectrum of a SERS signal derived from the Raman-active chemical substance that the nanotag has, for example, the number of the spectral peaks, the positions of the peaks, and the intensity of the peaks. Also, it is possible to acquire numerical information by matching the read SERS signal with an association between the SERS signal and the numerical information. The association may be a table indicating a direct correspondence between the SERS signal and the numerical information or may be a table indicating an indirect correspondence via nanotag ink as a source of the SERS signal and an arithmetic value of the signal.

It is possible to obtain a set of spectra of a series of SERS signals and to obtain a series of items of information regarding whether a specific tag is present at a specific position by applying different types of nanotags to a plurality of positions and scanning ranges including the positions with a Raman spectroscopy.

From the series of items of information, on the assumption that the number of types of the nanotags is defined as n and the number of positions to which the nanotags are applied is defined as k, it is possible to represent, at one position, n+1 types of numbers including a case in which no nanotags are applied and to represent, at k positions, (n+1) to the power of k numbers. It is also possible to cause different types of nanotags to be present together at the same position, and it is only necessary to handle the case as a case in which the number of types of nanotags has increased.

The expression of numbers according to the present invention can be compared to the base-N number system of mathematics. The base-N number system is a number expression method for representing numbers by arranging predefined N types of signs (numerals) by the number of digits. Similarly, k-digit numbers are expressed by arranging k numbers of types corresponding to whether or not the n types of nanotags are present, that is, k numbers of n+1 types of numerals in the present invention.

Example 1

Sodium chloride was added to a colloidal solution of gold nanoparticles (average particle diameter of about 60 nm) synthesized from a 0.3 mM chloroauric acid to achieve a concentration of 50 mM, and self-assemblies of the gold nanoparticles were caused by a shear field generated by stirring. During the stirring, 2,3-diaminonaphthalene, 4,4'-bipyridine, 1H-1,2,3-triazol were added as Raman-active chemical substances to achieve concentrations of 50 µM, 50 nM and 50 µM, respectively, thereby synthesizing three types of nanotag ink A, B and D. Absorption spectra with high apparent absorbance at 700 nm to 900 nm were obtained from all the types of ink.

The nanotag ink was directly irradiated with a laser with a wavelength of 785 nm for 200 ms using a Raman spectroscopic module 013560 (manufactured by Hamamatsu Photonics K.K.). Spectra of SERS signals with different shapes were obtained in accordance with the types of the chemical substances added as illustrated in FIG. 1, and peaks were detected at Raman shifts 835, 1265, 1399 and 1471 cm$^{-1}$ (FIG. 1A) for the nanotag ink A, at 1022, 1226 and 1296 cm$^{-1}$ (FIG. 1B) for the nanotag ink B, and at 982, 1099 and 1171 cm$^{-1}$ (FIG. 1D) for the nanotag ink D.

Example 2

FIG. 2 is a schematic diagram illustrating three types of nanotags applied to seven different positions of an article. The signs a, b, c and d in FIG. 2 are positions to which the nanotags should be applied. Among these, three different types of nanotags derived from the nanotag ink A, B and D were applied to positions a, b and d, respectively. No nanotags were applied to c. The sign e denotes the article. An image of nanotags applied to one or more different positions of an article is represented in this manner.

FIG. 3 is a schematic diagram illustrating a series of items of information including spectra of a series of SERS signals observed when the nanotags in FIG. 2 were scanned with a laser. FIG. 3 schematically illustrates that SERS spectra with different shapes were observed at positions to which the different types of nanotags were applied, SERS spectra with the same shape are observed at positions to which the same type of nanotags are applied, and no SERS spectra were observed at positions to which the nanotag ink was not applied, when the ranges including the positions a, b, c and d in FIG. 2 were irradiated with a laser. In this manner, it is possible to obtain a set of items of information regarding whether a certain type of nanotag ink is present at a certain position.

Example 3

A micropipette was used to eject 0.1 to 2 μL of nanotag ink A in Example 1 onto a paper, and 0.1 to 2 μL of nanotag ink B was also ejected to different positions on the same paper. The sizes of spreading stains of the nanotags increased up to several mm with the increase of the amounts of ejection. It was ascertained from preliminary observation using the Raman spectroscopic module C13560 that the sufficient amount for observation was 1 μL. No problems occurred in acquiring spectra even with the amount of 0.2 μL or less when positioning was carried out. Although the sizes of spreading stains of the nanotags depend on wettability of materials, the radii in the case of the amount of 0.2 μL were about 20 μm, and the radii in the case of the amount of 1 μL were about 1 mm.

Example 4

Printing was carried out using the nanotag ink A and B on the same paper as the paper used in Example 3. Similarly to Example 2, the position at which printing was carried out using the nanotag ink A was defined as a, the position at which printing was carried out using the nanotag ink B was defined as b, and the position, which was adjacent to the position b, on which printing was not carried out, was defined as c. Thereafter, each position was irradiated with a laser with a wavelength of 785 nm for 200 ms per position using a Raman spectroscopy RAM100S (manufactured by Lambda Vision Inc.) to scan a line including the positions a, b and c, thereby observing SERS spectra or RAMAN spectra. Results of the observation are shown in FIG. 4.

Peaks were detected at Raman shifts 811, 1243, 1372 and 1443 $cm^{-1}$ for the position a (FIG. 4a) while peaks were observed at 1000, 1197 and 1270 $cm^{-1}$ for the position b (FIG. 4b). Also, it was confirmed that the peak positions corresponded to the peak positions in Example 1 to a large extent with deviations of about 25 $cm^{-1}$. The deviations occurred because the different Raman spectroscopies were used with no correction, and it will be no problem to employ the results in Example 1 as reference for Example 4 as long as properties of the devices are known in advance. Therefore, the fact that the nanotag derived from the nanotag ink A was applied to the position a while the nanotag derived from the nanotag ink B was applied to the position b was shown. Also, no peaks were detected at the position c, and the fact that no nanotags were applied to the position c was shown (FIG. 4c).

Example 5

An example of how to express numbers using the nanotags according to the present invention will be described. In a case in which two types of nanotags a (derived from a nanotag ink A) and b (derived from a nanotag ink B) are applied to one position, for example, n+1=3 and k=1 are satisfied, and three types of numbers can be represented by associating presence or types of the nanotags with numerical values, for example, by associating a case in which neither of the two nanotags is applied with 0, associating a case in which nanotag a is applied with 1, and associating a case in which nanotag b is applied with 2. In a case in which there are three positions, it is possible to represent the cube of three, that is, twenty seven numbers by arranging numerals 0 to 2 into three digits like 000, 001, 002, 010, 011, 012, 020, 021, 022, 100, 101, 102, 110, 111, 112, 120, 121, 122, 200, 201, 202, 210, 211, 212, 220, 221 and 772.

The invention claimed is:

1. A method for expressing numerical information, the method comprising:
    associating a surface-enhanced Raman scattering [SERS] signal and one, two or more positions on a physical object with numerical representation,
    applying, to the one, two or more positions on the physical object, one, two or more types of nanotags including an aggregate of noble metal nanoparticles, the aggregate being a self-assembly, and a Raman-active chemical substance, the substance being present on the surface of or in the vicinity of the aggregate,
    irradiating the applied nanotags with a laser to generate SERS signals,
    reading the SERS signals generated by irradiating the applied nanotags, and
    acquiring numerical information from the SERS signals and the one, two or more positions based on the numerical representation,
    wherein a diameter of a noble metal nanoparticle is on average 100 nm or less, a nanotag derives from nanotag ink, and the method further comprises:
    synthesizing the nanotag ink by adding the Raman-active chemical substance to a dispersion of the aggregate of the noble metal nanoparticles, or adding the noble metal nanoparticles to be aggregated to a solution containing the Raman-active chemical substance to obtain a dispersion.

2. The method according to claim 1, wherein the laser has a wavelength overlapping a localized plasmon resonance wavelength that the nanotag has.

3. The method according to claim 1, wherein the nanotag is applied to the physical object through a process of printing, ejection, application, spraying or injection of the nanotag ink on the physical object.

4. The method according to claim 3, wherein the nanotag ink has an amount of 1 μL or less per position on the physical object.

5. The method according to claim 1, wherein the Raman-active chemical substance is a dye.

6. The method according to claim 1, wherein the Raman-active chemical substance is a non-dye difficult to be recognized visually.

7. The method according to claim 1, wherein the numerical information corresponds to numbers expressed by arranging n+1 numerical values at the respective places of k digits on the assumption that the number of types of the nanotags is defined as n and the number of positions to be applied is defined as k.

* * * * *